United States Patent
Shimomura et al.

(10) Patent No.: US 7,696,746 B2
(45) Date of Patent: Apr. 13, 2010

(54) MOTION DETECTING APPARATUS

(75) Inventors: Osamu Shimomura, Okazaki (JP); Tsutomu Nakamura, Kariya (JP); Kenji Takeda, Okazaki (JP); Akitoshi Mizutani, Okazaki (JP); Takao Ban, Toyohashi (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 550 days.

(21) Appl. No.: 11/647,568

(22) Filed: Dec. 29, 2006

(65) Prior Publication Data

US 2007/0268014 A1 Nov. 22, 2007

(30) Foreign Application Priority Data

Jan. 25, 2006 (JP) .............................. 2006-015942
Mar. 10, 2006 (JP) .............................. 2006-065326

(51) Int. Cl.
*G01B 7/30* (2006.01)
*G01B 7/14* (2006.01)

(52) U.S. Cl. ............................. 324/207.25; 324/207.16

(58) Field of Classification Search ...............................
324/207.15–207.16, 207.24–207.25, 253, 324/258; 73/862.192, 862.193, 862.331, 73/862.69

See application file for complete search history.

(56) References Cited

U.S. PATENT DOCUMENTS

| 7,271,585 | B2 * | 9/2007 | LaClair et al. | 324/207.26 |
| 2005/0083040 | A1 * | 4/2005 | Proctor | 324/207.15 |
| 2005/0088171 | A1 * | 4/2005 | Gualtieri | 324/207.26 |

FOREIGN PATENT DOCUMENTS

| JP | 2000-097958 | 4/2000 |
| JP | 2000-121655 | 4/2000 |

* cited by examiner

*Primary Examiner*—Bot L LeDynh
(74) *Attorney, Agent, or Firm*—Nixon & Vanderhye P.C.

(57) ABSTRACT

A turbine wheel of a turbocharger has a turbine blade. The turbine blade has a fin shape of which width in the rotation direction of the turbocharger is narrow, and is projected from the base portion of the turbine wheel. An inclined part of the turbine blade is inclined with respect to the rotation direction of the turbocharger. A coil is disposed so that the inclined part passes nearby as the turbine wheel rotates in a posture that an end in the center axis direction is directed toward the turbocharger. A detector detects a change in inductance, which occurs when the inclined part of the coil passes nearby.

16 Claims, 9 Drawing Sheets

MOTION DETECTING APPARATUS

CROSS-REFERENCE TO RELATED APPLICATION

This application is based on Japanese patent Applications No. 2006-15942 filed on Jan. 25, 2006, and No. 2006-65326 filed on Mar. 10, 2006, the disclosures of which are incorporated herein by reference.

FIELD OF THE INVENTION

The present invention relates to a motion detecting apparatus and, more particularly, to a motion detecting apparatus for detecting the number of revolutions, rotation speed, or rotation acceleration of a turbocharger.

BACKGROUND OF THE INVENTION

A motion detecting apparatus having a coil for generating a magnetic field and a conductive part to be detected which is interlocked with an object to be detected is disclosed in Japanese Unexamined Patent Application Publication Nos. 2000-97958 and 2000-121655. In the motion detecting apparatus, a rotor as a part to be detected has a projection. When the projection passes near the coil, the inductance of the coil changes. By detecting the change in the inductance, motion of an object to be detected is detected.

In the motion detecting apparatus, when the width in the rotation direction of the projection is narrowed, the passage period in which the projection passes near the coil is shortened. Consequently, a change in an output signal caused by a change in the inductance of the coil and a change in an output signal caused by noise cannot be distinguished from each other, so that the motion of a rotor cannot be detected accurately.

Since the motion detecting apparatus uses a winding coil formed by winding a wire around a bobbin or the like, variation in the inductance of the coil becomes large due to uneven winding, and a problem occurs such that a detection error in the motion detecting apparatus increases.

SUMMARY OF THE INVENTION

The present invention is achieved to solve the problems and an object of the invention is to provide a motion detecting apparatus with a simple configuration capable of accurately detecting a motion to be detected.

A motion detecting apparatus of the present invention includes: a conductive part to be detected, provided for an object to be detected; and a coil generating a magnetic field and disposed so that the part to be detected passes nearby as the object to be detected moves. By detecting a change in inductance of the coil which occurs when the part to be detected passes near the coil, the motion of the object to be detected is detected. The part to be detected has a fin shape in which width in the motion direction of the object to be detected is small at an end on the coil side, and is inclined with respect to the motion direction of the object to be detected.

By the inclination, the passage period in which the part to be detected passes near the coil is extended. As a result, the part to be detected can be detected accurately, so that the motion of the object to be detected can be detected accurately.

In the motion detecting apparatus of the invention, the coil has conductors formed in different layers of a multilayer printed board, and a through hole connecting the plurality of conductors in series. Since the conductors and the through hole are formed by using the microfabrication process of a printed board, variations in the inductance of the coil are small and a deviation from a specific value of the inductance of the coil is small. Therefore, a detection error of the motion detecting apparatus can be reduced.

BRIEF DESCRIPTION OF THE DRAWINGS

Other objects, features and advantages of the present invention will become more apparent from the following detailed description made with reference to the accompanying drawings, in which like parts are designated by like reference numbers.

DETAILED DESCRIPTION OF EMBODIMENTS

First Embodiment

Figure 1:
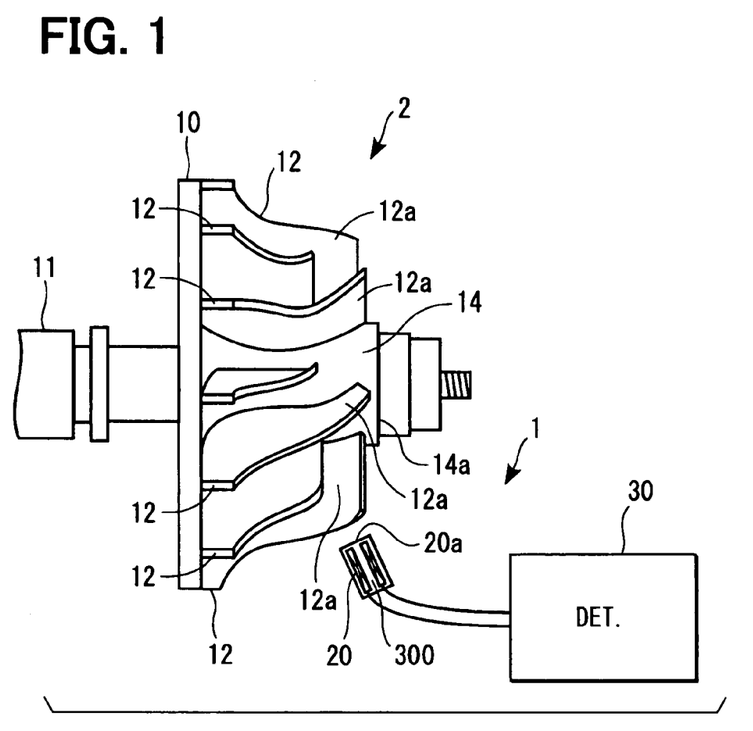
FIG. 1 is a schematic diagram illustrating a motion detecting apparatus of a first embodiment.

FIG. 1 is a schematic diagram showing a motion detecting apparatus of a first embodiment of the invention. A motion detecting apparatus 1 of an embodiment of the invention is an apparatus for detecting rotation speed of a turbocharger 2 as an object to be detected.

The turbocharger 2 includes a turbine wheel 10 rotated by the flow of exhaust gas of an engine, a not-shown compressor wheel rotating together with the turbine wheel 10 to compress intake air, a rotary shaft 11 connecting the turbine wheel 10 and the compressor wheel, a not-shown housing, and a controller.

The turbine wheel 10 and the compressor wheel are provided with a fin-shaped turbine blade 12 and a fin-shaped compressor blade, respectively. The configuration and operation of the motion detecting apparatus 1 will be described hereinbelow in order.

The motion detecting apparatus 1 includes the turbine blade 12, a coil 20, a detector 30, and a controller for the turbocharger 2.

The turbine blade 12 is made of a conductor such as aluminum. The turbine blade 12 has a fin shape of which width is narrow in the rotation direction of the turbocharger 2, and is projected from a base part 14 of the turbine wheel 10. The turbine blade 12 is twisted at around the tip 14a of the base part 14 and is inclined with respect to the rotation direction of the turbocharger 2. Hereinbelow, a part inclined with respect to the rotation direction of the turbocharger 2 in the turbine blade 12 will be called an inclined part 12a.

The coil 20 is disposed so that an end 20a in the center axis direction is directed to the turbocharger 2. When the turbocharger 2 rotates, the end of the inclined part 12a passes near the coil 20. In this case, the end in the radial direction of the turbocharger 2 of the inclined part 12a corresponds to a part to be detected. The coil 20 is inserted in a resin 300 and attached to the housing of the turbocharger 2.

Figure 2:
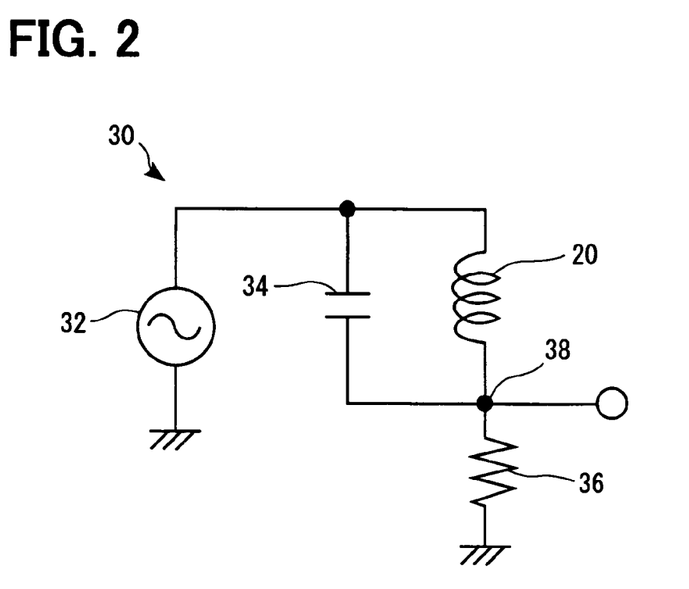
FIG. 2 is a schematic diagram showing a coil and a detector in the first embodiment.

FIG. 2 is a circuit diagram showing the coil 20 and the detector 30.

The detector 30 drives the coil 20 to generate a magnetic field, and detects a change in the inductance of the coil 20 which occurs when the inclined part 12a passes near the coil 20. The detector 30 is connected to the above-described controller of the turbocharger 2.

The detector 30 is constructed by an oscillator 32, a capacitor 34, a resistor 36, a not-shown envelope detector, a comparator, and the like. The coil 20 and the capacitor 34 form a parallel resonant circuit, and the resistor 36 is connected in series to the resonant circuit. The oscillator 32 drives a circuit constructed by the resonant circuit and the resistor 36 by alternate current. The input terminal of the envelope detector is connected to a contact 38 between the coil 20 and the capacitor 34 of the resonant circuit and the resistor 36. The input terminal of the comparator is connected to the output terminal of the envelope detector.

The operation of the motion detecting apparatus will be described below.

When the oscillator 32 of the detector 30 drives the coil 20, a magnetic field is generated by the coil 20. When the turbocharger 2 rotates, the turbine blade 12 passes near the coil 20. Since the magnetic flux density around the coil 20 is high, in a passage period in which the turbine blade 12 passes near the coil 20, a magnetic flux generated by the coil 20 encircles the turbine blade 12, and large eddy current is generated in the turbine blade 12. In a period in which the turbine blade 12 does not pass, eddy current is hardly generated in the turbine blade 12.

Since the eddy current flows in the direction of canceling off a change in the magnetic field caused by the coil 20, it exerts an influence on the inductance of the coil 20. As a result, the impedance of the coil in the passage period of the turbine blade 12 and that in the non-passage period are largely different from each other, and the resonance frequency of the resonant circuit in the passage period and that in the non-passage period are largely different from each other. As the resonance frequency of the resonant circuit changes, the potential amplitude at the contact 38 changes.

Figure 3A:
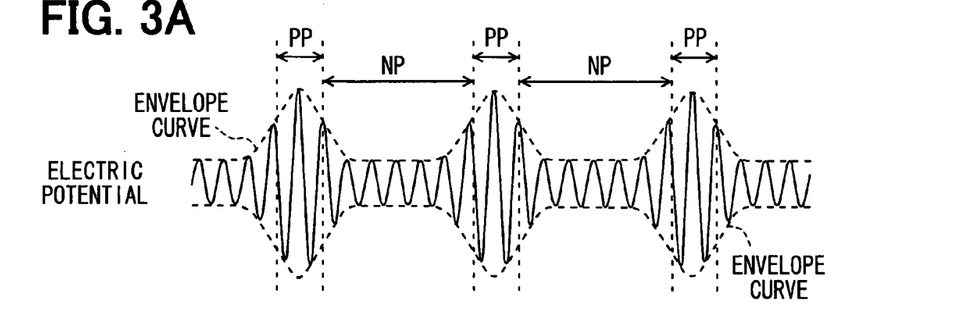
FIGS. 3A to 3C are schematic diagrams illustrating the detector in the first embodiment.

In the case where the oscillator 32 oscillates near the resonance frequency in the non-passage period of the resonant circuit, as shown in FIG. 3A, in the passage period PP of the turbine blade 12, the resonant circuit is driven by alternating current deviated from the resonance frequency, and the impedance of the resonant circuit becomes low. Consequently, the potential amplitude of the contact 38 in the passage period becomes large. On the other hand, in the non-passage period NP of the turbine blade 12, the resonant circuit is driven by the alternating current of the resonance frequency, and the impedance of the resonant circuit becomes high. Consequently, the potential amplitude of the contact 38 in the non-passage period NP becomes small.

Figure 3B:
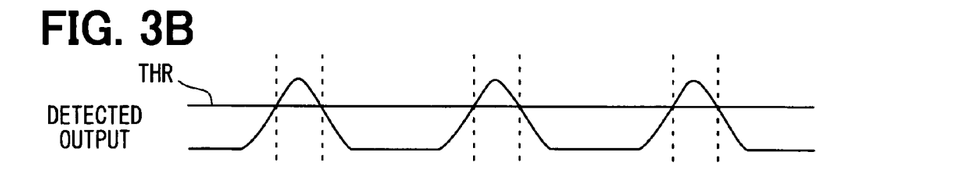
Figure 3C:
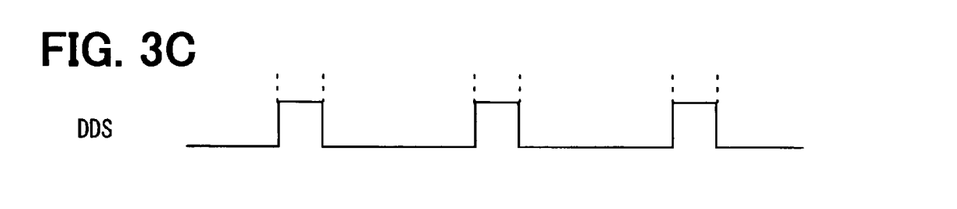

As shown in FIG. 3B, the envelope detector detects envelope of potential vibration at the contact 38. As shown in FIG. 3C, the comparator converts an analog signal indicative of the envelope of the potential vibration at the contact 38 to a digital signal (hereinbelow, called a detection signal DDS) by using a predetermined threshold THR, and outputs the detection signal DDS to the controller of the turbocharger 2. The controller of the turbocharger 2 detects the rotational speed of the turbocharger 2 by detecting the motion of the turbine blade 12 on the basis of a digital signal output from the comparator. Concretely, the controller detects the rotational speed of the turbocharger 2 from the number of times the turbine blade 12 passes near the coil in predetermined unit time and the number of turbine blades 12 provided for the turbine wheel 10.

As described above, the motion detecting apparatus 1 detects the rotational speed of the turbocharger 2 by using the turbine blade 12. The configuration is simpler as compared with a motion detecting apparatus having a motion-detecting rotor interlocked with the turbocharger 2. That is, according to the present invention, the configuration of the motion detecting apparatus can be simplified, so that the manufacturing cost of the motion detecting apparatus can be reduced and the motion detecting apparatus can be miniaturized.

Figure 4A:
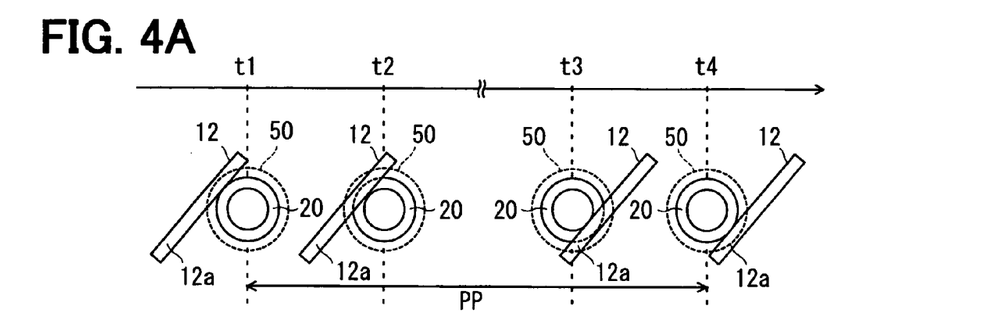
FIGS. 4A and 4B are schematic diagrams illustrating passage periods of a turbine blade.
Figure 4B:
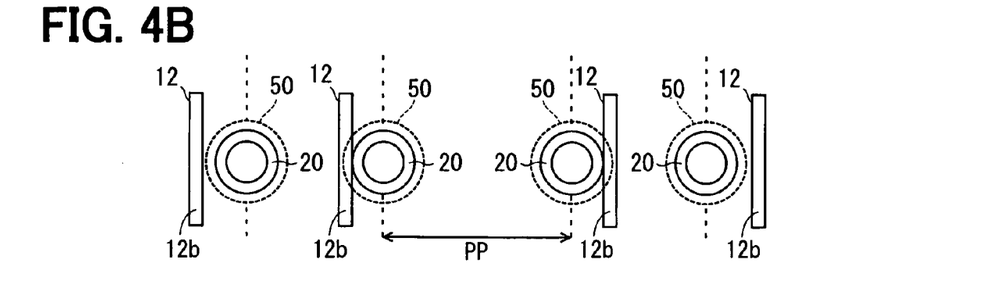
Figure 5:
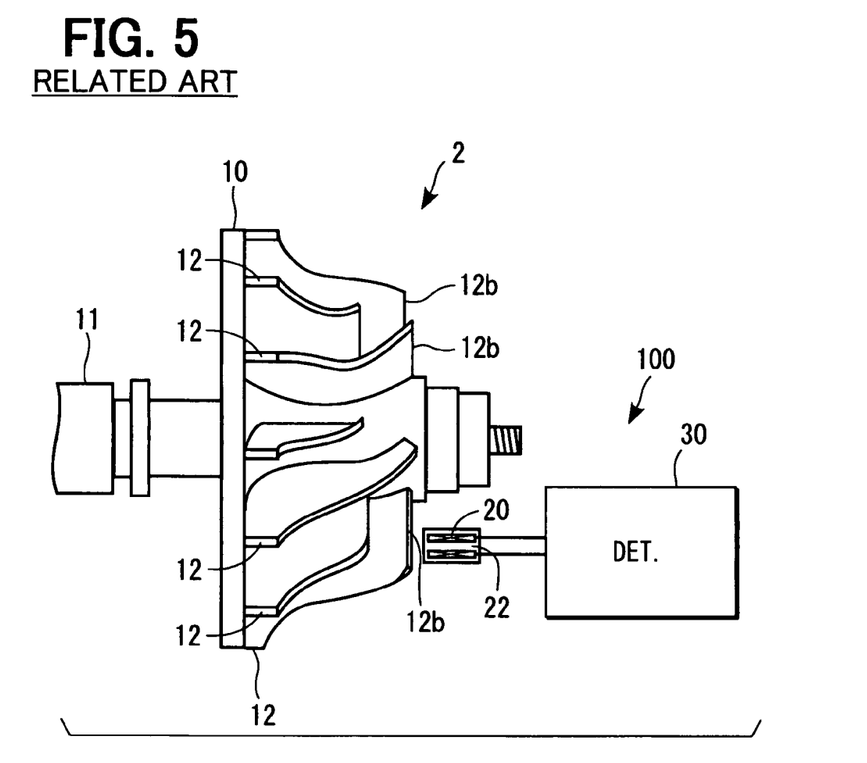
FIG. 5 is a schematic diagram showing a comparative example.

FIGS. 4A and 4B are schematic diagrams illustrating the passage periods of the turbine blade 12. FIG. 5 is a schematic diagram showing a motion detecting apparatus 100 as a comparative example. FIG. 4A shows a passage period (from t1 to t4) in the motion detecting apparatus 1, and FIG. 4B shows a passage period (from t2 to t3) in the motion detecting apparatus 100 as a comparative example. Region 50 indicated by broken lines in FIGS. 4A and 4B show regions in which the magnetic flux density generated by the coil 20 is high. In the motion detecting apparatus 100 as a comparative example shown in FIG. 5, the coil 20 is disposed so that an orthogonal part 12b of the turbine blade 12 passes near the coil 20. The orthogonal part 12b is a part orthogonal to the rotation direction of the turbocharger 2, in the turbine blade 12.

As obvious from FIGS. 4A and 4B, by disposing the coil so that the inclined part 12a passes near the coil 20 in association with the rotating motion of the turbine wheel 10, as compared with the motion detecting apparatus in which the orthogonal part 12b passes near the coil 20, the passage period PP of the turbine blade 12 can be extended.

In the case of detecting the rotational speed of the turbocharger 2 by using the turbine blade 12 of the turbocharger 2, the passage period PP of the turbine blade 12 is shorter than the non-passage period NP. By widening the signal width indicative of the passage period of a detection signal by extending the passage period PP of the turbine blade 12, the motion detecting apparatus 1 can detect the motion of the turbine blade 12 accurately. Concretely, by widening the signal width indicative of the passage period PP of a detection signal, even if noise having a narrow pulse width occurs in a detection signal, the noise can be easily eliminated from the detection signal.

Figure 6:
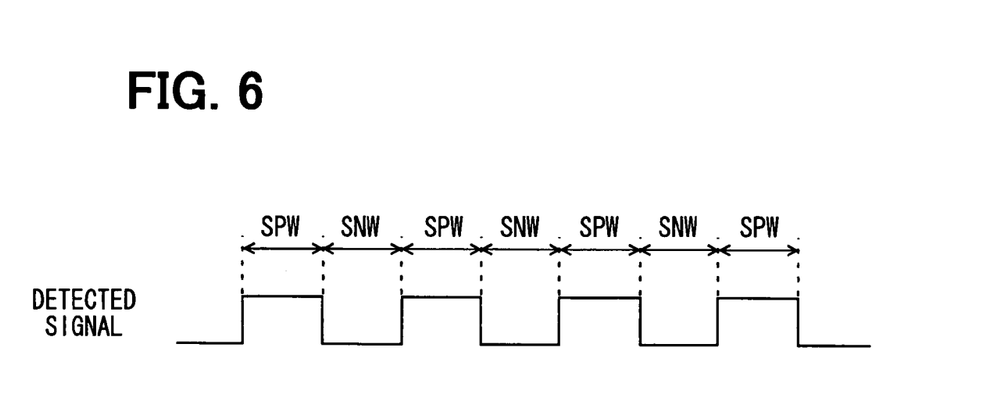
FIG. 6 is a schematic diagram showing output signals of the detector in the first embodiment.

FIG. 6 is a schematic diagram showing a detection signal of the motion detecting apparatus 1 and shows a detection signal when the turbocharger 2 rotates at constant speed.

In the detection signal of FIG. 6, a signal width SPW indicative of the passage period of the turbine blade 12 and a signal width SNW indicative of the non-passage period of the turbine blade 12 are almost the same. According to such a detection signal, even when the cycle of the detection signal becomes shorter, that is, the rotational speed of the turbocharger 2 becomes higher, one of the signal width SPW indicative of the passage period of the turbine blade 12 and the signal width SNW indicative of the non-passage period of the turbine blade 12 can be prevented from becoming narrower than the other. As a result, even if the revolution speed of the turbine blade 12 becomes high, the motion detecting apparatus 1 can accurately detect the motion of the turbine blade 12.

Figure 7:
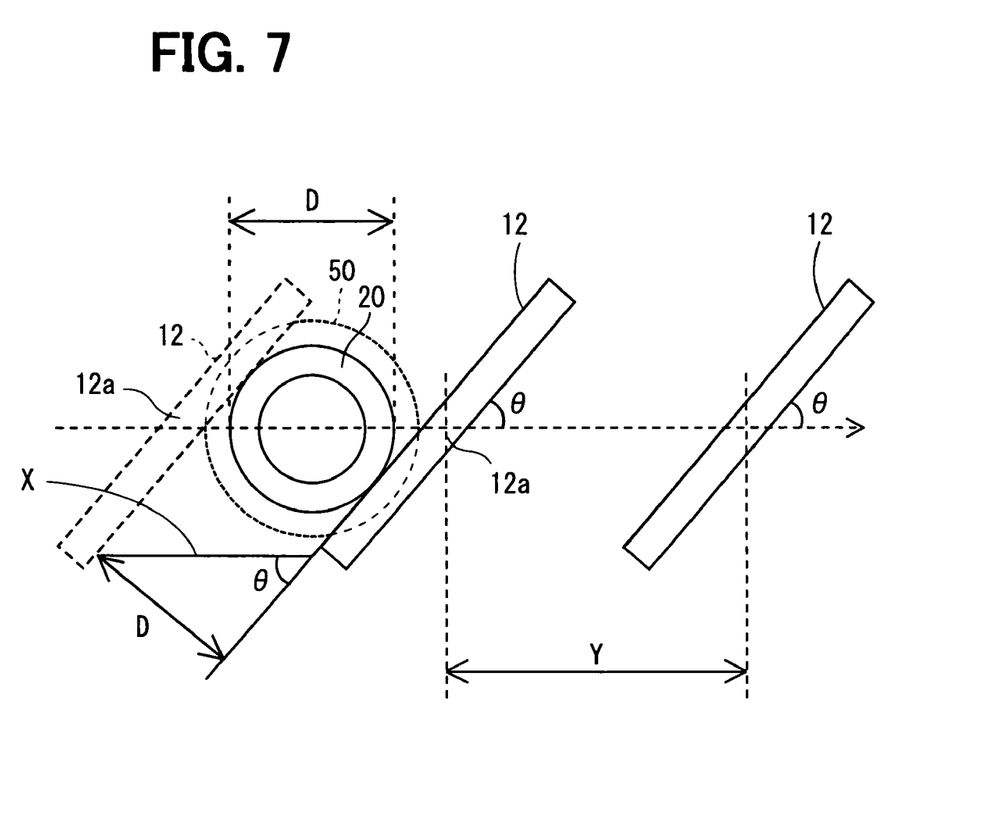
FIG. 7 is a schematic diagram showing a method of designing the motion detecting apparatus of the first embodiment.

FIG. 7 is a schematic diagram showing a designing method for obtaining a detection signal as shown in FIG. 6 in the motion detecting apparatus 1.

The cycle of the detection signal is correlated with an interval Y of the inclined parts 12a of the neighboring turbine blades 12. Therefore, to make the signal widths SPW and SNW almost the same as shown in FIG. 6, when distance of movement of the inclined part 12a in the half cycle of the detection signal is Z, the interval Y and the distance Z have to have the relation shown by the following equation (1).

$$Z = \frac{Y}{2} \quad (1)$$

As shown in FIG. 7, the distance X of movement of the inclined part 12a in the period in which the impedance of the coil 20 changes is expressed by the following equation (2) using the diameter D of the coil and the angle θ with respect to the rotation direction of the turbocharger 2, of the inclined part 12a.

$$X = \frac{D}{\sin\theta} \quad (2)$$

On the other hand, the ratio of a change in the impedance of the coil 20 in the signal width indicative of the passage period of the detection signal can be adjusted by the threshold in the comparator of the detector 30. Therefore, the following equation (3) is satisfied between the distances X and Z. The ratio α is a numerical value determined by the threshold in the comparator of the detector 30.

$$X = \alpha Z \quad (3)$$

Therefore, the angle θ with respect to the rotation direction of the turbocharger 2 of the inclined part 12a is expressed by the following equation (4).

$$\theta = \sin^{-1}\frac{2D}{\alpha Y} \quad (4)$$

By disposing the coil 20 near the inclined part 12a at the angle of the equation (4) with respect to the rotation direction of the turbocharger 2, a detection signal in which the signal widths SPW and SNW are the same can be obtained.

In the foregoing first embodiment of the present invention, by detecting the rotational speed of the turbocharger 2 by using the turbine blade 12, the configuration of the motion detecting apparatus 1 can be simplified as compared with the motion detecting apparatus having the rotor for the motion detection interlocked with the turbocharger 2.

The motion detecting apparatus 1 can accurately detect the turbine blade 12 as an object to be detected.

Second Embodiment

Figure 8A:
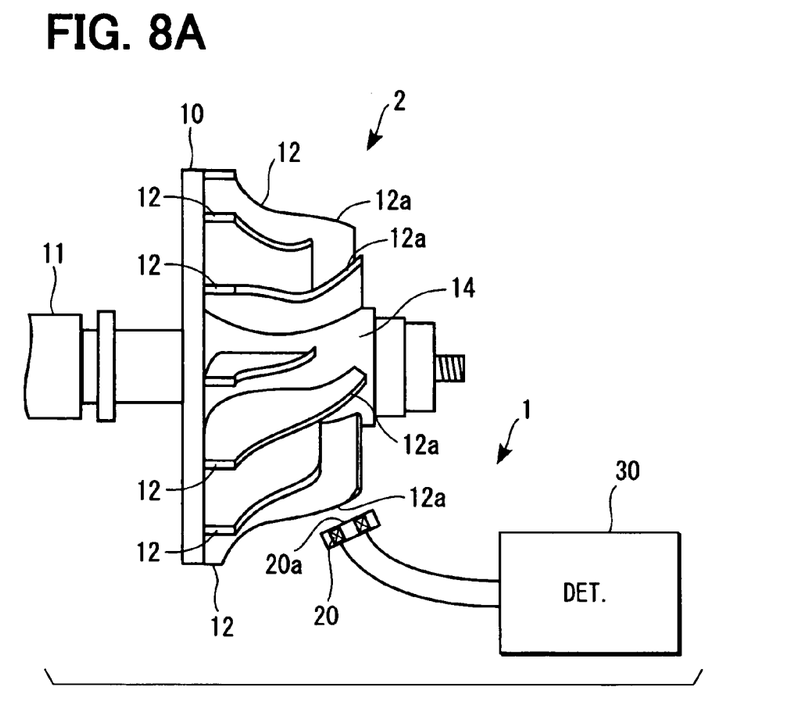
FIGS. 8A and 8B are schematic diagrams illustrating a motion detecting apparatus of a second embodiment.
Figure 8B:
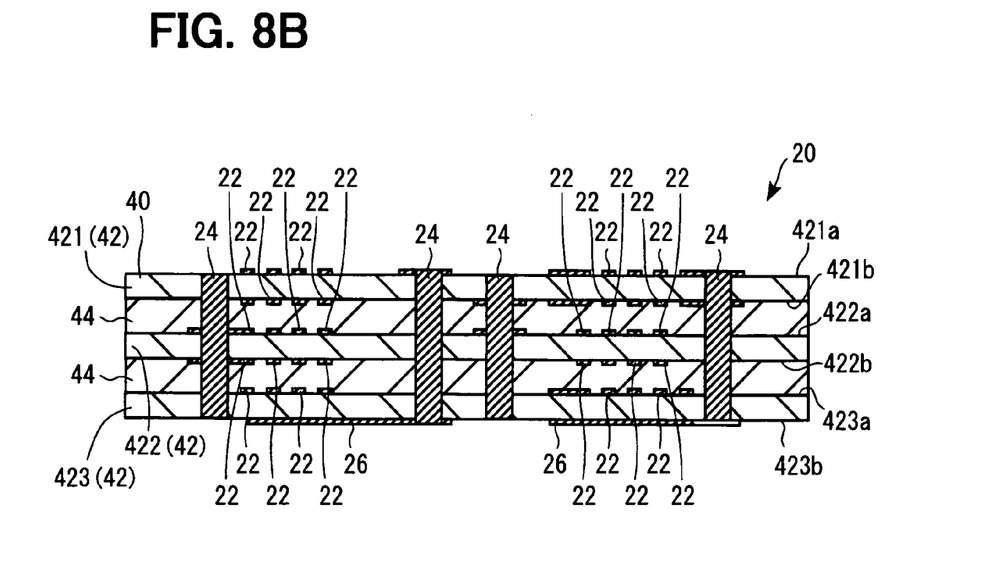

As shown in FIGS. 8A and 8B, the coil 20 is constructed by conductors 22 formed in different layers of a multilayer printed board 40, through holes 24 for connecting a plurality of conductors 22 in series, and external connection terminals 26 for connecting the coil 20 and the detector 30. Concretely, the conductors 22 and the external connection terminals 26 are formed, for example, in stacked insulators 42 sandwiching bonding layers 44 in the multilayer printed board 40. By the through holes 24, the conductors 22 formed in the different insulators 42 or different faces of the same insulator 42 are connected in series, and both ends of the conductors 22 connected in series and the external connection terminals 26 are connected.

Figure 9A:
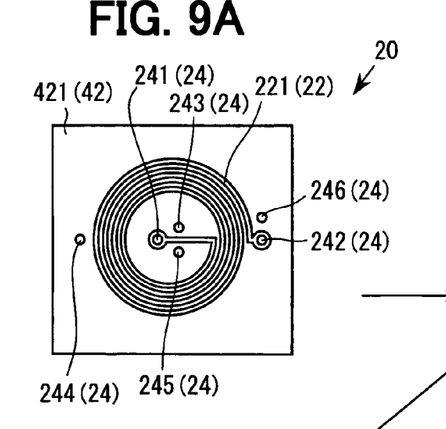
FIGS. 9A to 9F are schematic diagrams showing the configuration of a coil in the second embodiment.
Figure 9B:
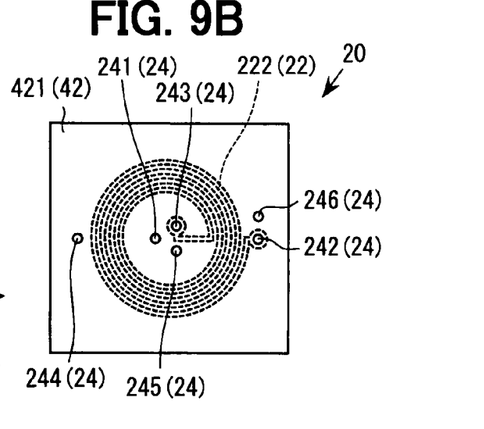
Figure 9C:
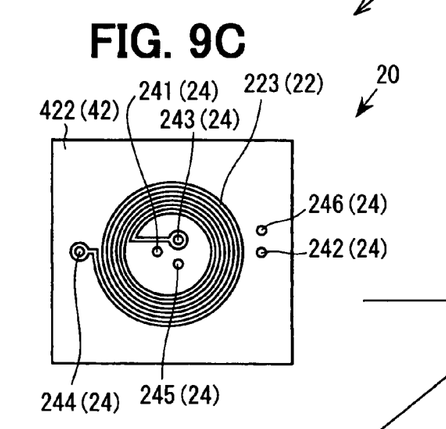
Figure 9D:
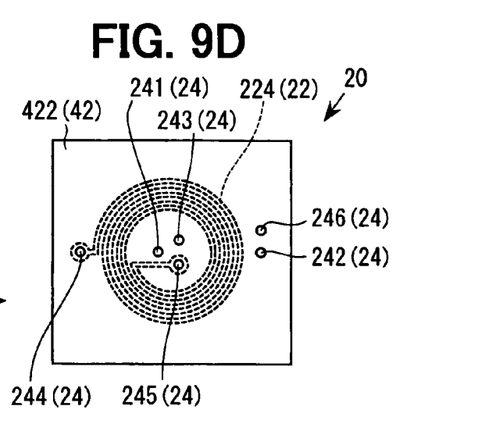
Figure 9E:
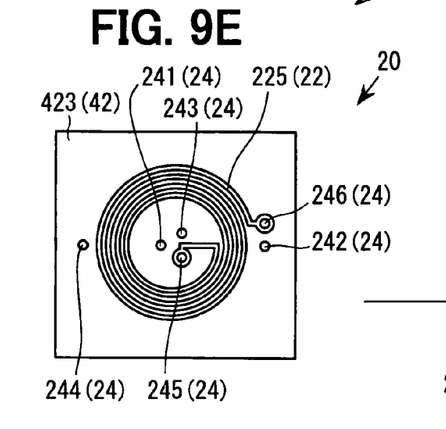
Figure 9F:
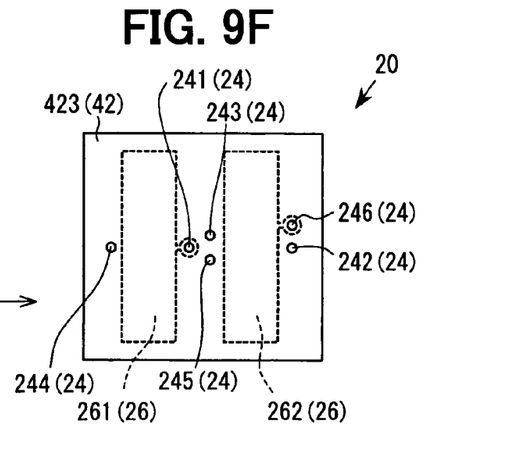

FIGS. 9A to 9F are schematic diagrams showing an example of the configuration of the coil 20. FIGS. 9A and 9B show the first layer on the turbine blade 12 side of the multilayer printed board 40. FIGS. 9C and 9D show the second layer in the multilayer printed board 40. FIGS. 9E and 9F show the third layer on the side opposite to the turbine blade 12 of the multilayer printed board 40. FIGS. 9A to 9F are plan views seen from the turbine blade 12 side of the insulator 42. In FIGS. 9B, 9D, and 9F, the conductor 22 formed on the face opposite to the turbine blade 12 of the insulator 42 is shown by broken lines, and the conductor 22 formed on the face of the turbine blade 12 side of the insulator 42 is not shown.

The coil 20 is provided for the multilayer printed board 40 made of three layers. Conductors 221 to 225 are formed on all of the faces except for the face on which the external connection terminals 26 are formed, of insulators 421 to 423 constructing the multilayer printed board 40. The external connection terminals 26 are formed on a face 423b (refer to FIG. 8B) on the side opposite to the turbine blade 12 of the insulator 423 which is the furthest from the turbine blade 12. The number of layers of the conductors 22 of such a coil 20 is an odd number.

Concretely, as shown in FIG. 9A, on a face 421a (refer to FIG. 8B) on the turbine blade 12 side of the insulator 421 as a first layer of the multilayer printed board 40, the conductor 221 extended so as to be wound from a through hole 241 to a through hole 242 is formed. As shown in FIG. 9B, on a face 421b (refer to FIG. 8B) on the side opposite to the turbine blade 12 of the insulator 421, the conductor 222 extended so as to be wound from the through hole 242 to a through hole 243 is formed. The conductors 221 and 222 are connected in series via the through hole 242. The conductors 221 and 222 are wound in a circular shape.

Like the first layer of the multilayer printed board 40, on a face 422a (refer to FIG. 8B) on the turbine blade 12 side of the insulator 422 as a second layer of the multilayer printed board 40, the conductor 223 extended so as to be wound from the through hole 243 to a through hole 244 is formed. On a face 422b (refer to FIG. 8B) on the side opposite to the turbine blade 12 of the insulator 422, the conductor 224 extended so as to be wound from the through hole 244 to a through hole 245 is formed. The conductors 222 and 223 are connected in series via the through hole 243. The conductors 223 and 224 are connected in series via the through hole 244.

On a face 423a (refer to FIG. 8B) on the turbine blade 12 side of the insulator 423 as a third layer of the multilayer printed board 40, the conductor 225 extended so as to be wound from the through hole 245 to a through hole 246 is formed. On a face 423b (refer to FIG. 8B) on the side opposite to the turbine blade 12 of the insulator 422, the external connection terminal 26 is formed. To the external connection terminals 261 and 262, both ends of the conductors 221 to 225 connected in series are connected via the through hole 242 or 246.

As described above, in the coil 20, the conductors 22 each having four turns are stacked in five layers, so that the number of turns of the coil 20 is 20.

Figure 10A:
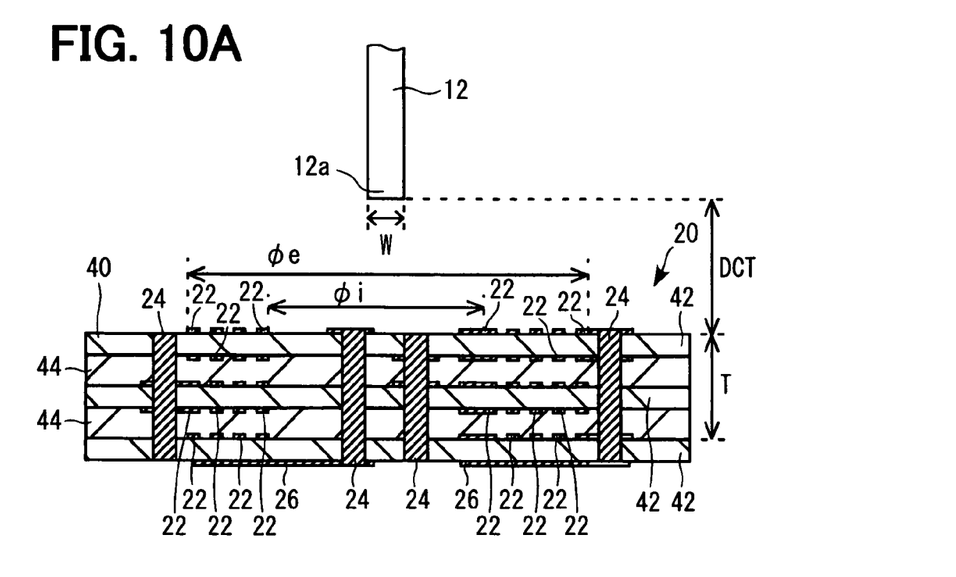
FIGS. 10A and 10B are schematic diagrams showing a method of designing the motion detecting apparatus of the second embodiment.
Figure 10B:
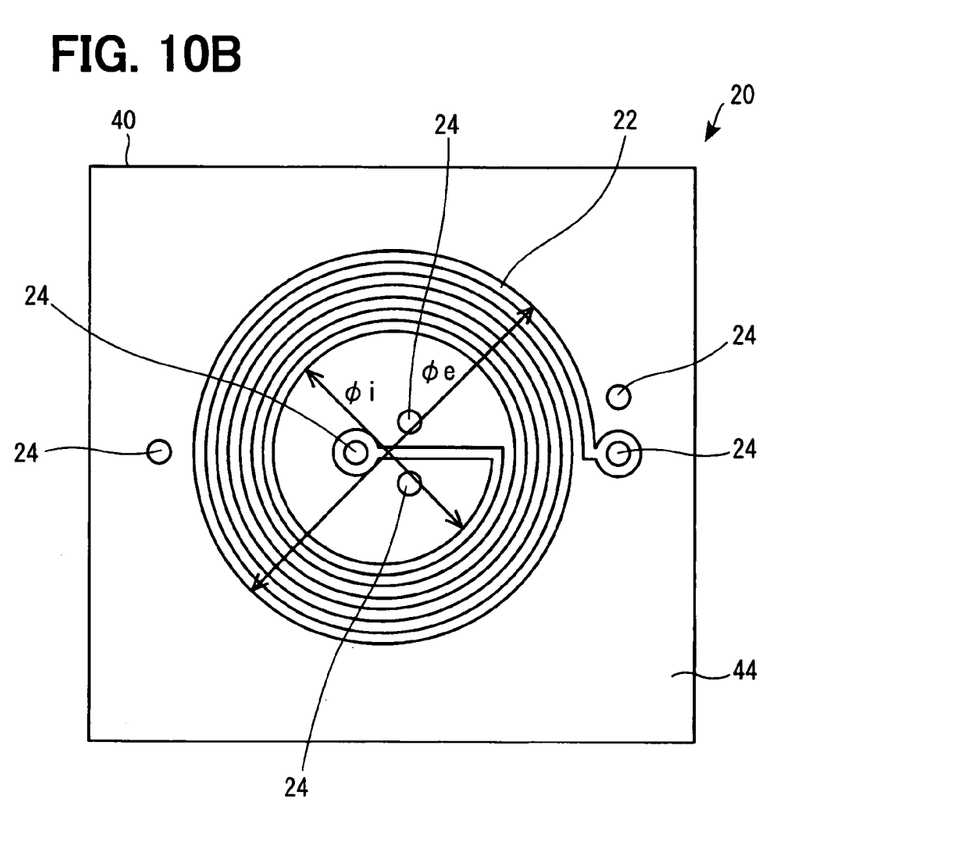

FIGS. 10A and 10B are schematic diagrams showing a method of designing the motion detecting apparatus 1.

Generally, the width W in the rotation direction of the turbine blade 12 is 0.2 mm to 2.0 mm. An interval D between the coil 20 and the turbine blade 12 is about 1 mm in consideration of manufacture tolerance of the motion detecting apparatus 1. To accurately detect the rotating motion of the turbocharger 2, preferably, the inductance variable of the coil 20 is 5 nH or larger, and the Q value of the coil 20 is 20 or larger.

As described above, the coil 20 is provided on the multilayer printed board 40, so that the number of turns is smaller than that of a winding coil. As a result, it is not easy to increase the inductance of the coil 20, and the inductance of the coil 20 is about 1 µH. Therefore, to set the inductance variable of the coil 20 to 5 nH or larger, the rate of change in the inductance of the coil 20 has to be set to 0.5% or higher.

Figure 11:
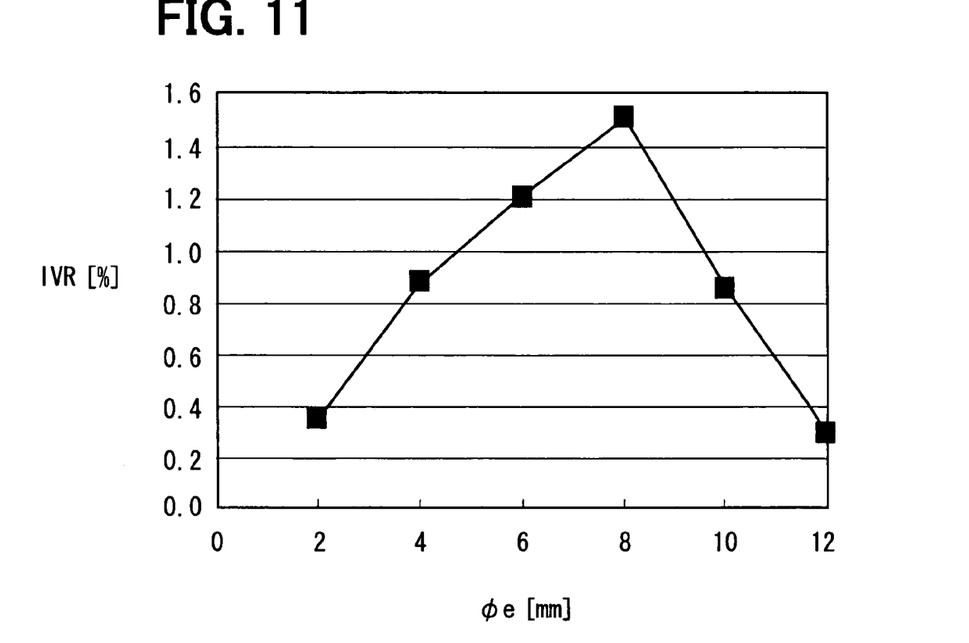
FIG. 11 is a graph showing the method of designing the motion detecting apparatus of the second embodiment.

FIG. 11 is a schematic diagram showing the relation between the maximum outside diameter φe of the conductor 22 of the coil 20 and the inductance change rate IVR of the coil 20. The graph in FIG. 11 shows an experiment result of measurement of the inductance change rate IVR of the coil 20 while changing the maximum outside diameter φe (refer to FIG. 10B) of the conductor 22 from 2 mm to 12 mm in the motion detecting apparatus 1 in which the width W in the rotation direction of the turbine blade 12 is 0.5 mm and the interval D between the coil 20 and the turbine blade 12 is 1 mm. It is understood that, by setting the maximum outside diameter φe of the conductor 22 to 3 mm to 10 mm, the inductance change rate IVR of the coil 20 becomes 0.5% or higher.

The experiment result is obtained because the width W in the rotation direction of the turbine blade 12 as a part to be detected is small. Specifically, by increasing the maximum outside diameter φe of the conductor 22, a magnetic flux penetrating the part to be detected increases. However, since the width W in the rotation direction of the turbine blade 12 is small, the amount of magnetic fluxes which do not penetrate the part to be detected is also large. As a result, when the maximum outside diameter φe of the conductor 22 is in a predetermined range according to the width W in the rotation direction of the turbine blade 12, the inductance change rate IVR of the coil 20 is high.

As described above, to set the inductance variable of the coil 20 to 5 nH or larger, it is sufficient to set the inductance of the coil 20 to 1 µH or larger, and set the maximum outside diameter φe of the coil 20 to 3 mm to 10 mm. Concretely, it is sufficient to set the maximum outside diameter φe of the coil 20 to, for example, about 4 mm. In the case of setting the maximum outside diameter φe of the coil 20 to about 4 mm, by setting the minimum inside diameter φi (refer to FIG. 10B) of the coil 20 to about 2 mm and by setting the number of turns of the coil 20 to 20, the inductance of the coil 20 becomes about 1 µH.

Figure 12:
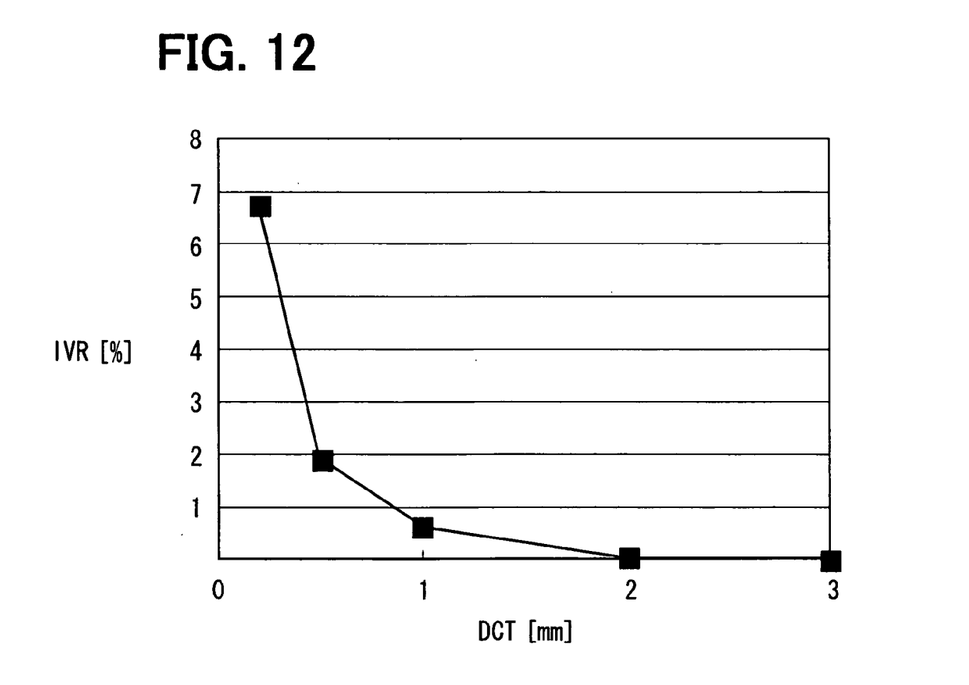
FIG. 12 is a graph showing the method of designing the motion detecting apparatus of the second embodiment.

FIG. 12 is a schematic diagram showing the relation between the interval DCT between the coil 20 and the turbine blade 12 and the inductance change rate IVR of the coil 20. The graph of FIG. 12 shows an experiment result of measurement of the inductance change rate IVR of the coil 20 while changing the interval DCT between the coil 20 and the turbine blade 12 from 0.2 mm to 3.0 mm in the motion detecting apparatus 1 in which the width W in the rotation direction of the turbine blade 12 is 0.5 mm and the maximum outside diameter φe of the conductor 22 of the coil 20 is 4 mm. It is understood that, although the inductance change rate IVR decreases as the interval DCT increases, when the interval DCT increases to about 3.0 mm, the inductance change rate IVR hardly changes.

That is, the number of turns of the conductor 22 when the interval DCT is wider than 3 mm hardly exerts an influence on the inductance change rate of the coil 20. Therefore, by designing the thickness T in the axial direction of the coil 20 so that the sum of the interval DCT and the thickness T (refer to FIG. 10A) in the axial direction of the coil 20 becomes 3 mm or less, the thickness T in the axial direction of the coil 20 can be reduced without deteriorating the inductance change rate of the coil 20.

As described above, the interval DCT between the coil 20 and the turbine blade 12 is about 1 mm, so that it is sufficient to set the thickness T in the axial direction of the coil 20 to 2 mm or less. Since the interval between the neighboring insulators 42 in the multilayer printed board 40 is about 200 µm, the number of layers of the conductor 22 of the coil 20 is 11 or less.

On the other hand, the Q value of the coil 20 is expressed by the following equation (5). As described above, the inductance L of the coil 20 is about 1 µH, and excitation frequency "f" of the coil 20 is 10 MHz.

$$Q=2\pi f(L/R) \quad (5)$$

Therefore, to set the Q value of the coil 20 to 20 or larger, it is sufficient to set the resistance value of the coil 20 to 3Ω or less. Concretely, in the coil 20 having the maximum outside diameter φe of 4 mm, the minimum inside diameter φi of 2 mm, and the number of turns of 20, by setting the sectional area on the shorter side of the conductor 22 to 0.0015 mm² or larger, the resistance value of the coil 20 can be set to 3Ω or less.

In the foregoing second embodiment, the coil 20 is formed by using the microfabrication technique of a printed board, so that variations in the inductance of the coil 20 are small. Therefore, a detection error of the motion detecting apparatus 1 can be reduced. Since such a coil 20 is suitable for mass production, the manufacture cost is low.

As described above, the external connection terminal 26 is formed on the face on the side opposite to the turbine blade 12 of the insulator 423 as the third layer of the multilayer printed board 40. As a result, even when the detector 30 is connected to the external connection terminal 26 of the coil 20, the inductance variable of the coil 20 hardly decreases. Increase in a detection error of the motion detecting apparatus 1 caused by connecting the external connection terminal 26 of the coil 20 and the detector 30 can be suppressed.

Third Embodiment

Components of a motion detecting apparatus according to a third embodiment are substantially the same as those of the motion detecting apparatus 1 according to the second embodiment except for the coil. In the third embodiment, the components designated with the same reference numerals as those in the second embodiment correspond to the components in the second embodiment.

Figure 13:
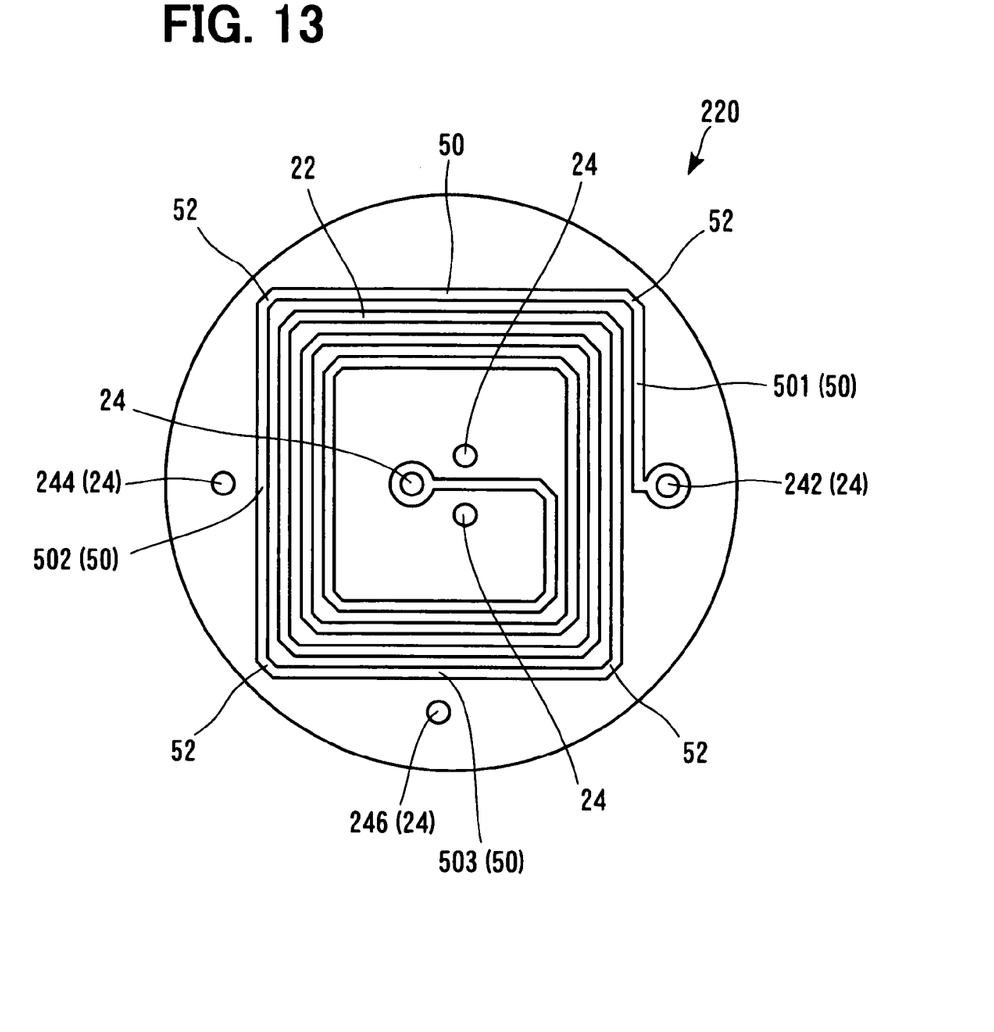
FIG. 13 is a schematic diagram showing the configuration of a coil in a third embodiment.

FIG. 13 is a schematic diagram showing a coil 220 according to the third embodiment.

The multilayer printed board 40 of the coil 220 has a disc shape. Consequently, the coil 220 can be attached to a cylindrical-shaped mounting hole which can be easily formed.

The conductor 22 of the coil 220 has a polygonal winding shape. The through holes 24 on the outside of the maximum outside diameter of the conductor 22 are disposed near the center of sides 50 of the conductor 22. Concretely, the conductor 22 of the coil 220 has, for example, an almost square winding shape. The through holes 242, 244, and 246 on the outside of the maximum outer diameter of the conductor 22 are disposed near the center of sides 501, 502, and 503, respectively, of the conductor 22.

The maximum outside diameter of the sides 50 of the conductor 22 is smaller than that of corners 52 of the conductor 22, and the maximum outside diameter of the sides 50 of the conductor 22 decreases toward the center. Therefore, by disposing the through holes 24 on the outside of the maximum outside diameter of the conductor 22 near the center of the sides 50 of the conductor 22, the outside diameter of the coil 220 can be decreased, and the size of the coil 220 can be reduced.

Modifications

Although the motion detecting apparatus 1 detects the rotation speed of the turbocharger 2 in the foregoing embodiment of the invention, an object to be detected is not limited to the turbocharger 2. For example, the object to be detected may be a turbocharger having a configuration different from that of the turbocharger 2, another turbine different from the turbocharger 2, or a turbocharger making a translational motion, not the rotational motion. A physical quantity detected by the motion detecting apparatus 1 may be rotational speed or rotation acceleration.

It has been described that the motion detecting apparatus 1 detects the rotational speed of the turbocharger 2 using, as a part to be detected, the end in the radial direction of the turbocharger 2 of the inclined part 12a. Alternatively, the motion detecting apparatus 1 may use, as the part to be detected, a part inclined with respect to the rotation direction of the turbocharger 2 of the turbine blade 12, which is different from the above-described end of the inclined part 12a, or an inclined part of a compressor blade.

It has been described that the end 20a in the center axis direction of the coil 20 is disposed so as to face the turbine wheel 10. However, the coil 20 may have any posture as long as it is disposed near the turbine wheel 10.

The signal width indicative of the passage period of a detection signal and the signal width indicative of the non-passage period may be different from those described above in a range where the turbine blade 12 can be accurately detected.

The conductor 22 may not be formed on all of faces except for the face on which the external connection terminal 26 of the insulator 42 forming the multilayer printed board 40 is formed. The conductor 22 can be formed also on the face on which the external connection terminal 26 is formed of the insulator 42. The conductor 22 and the external connection terminal 26 may be formed only on one side of each of all of the insulators 42 forming the multilayer printed board 40.

The coil 20 may be provided for a multilayer printed board made of two layers, or the multilayer printed board 40 made of four or more layers.

The multilayer printed board 40 may be a rigid or flexible board, or a built-up board.

On the multilayer printed board 40, circuits other than the coil 20 may be also formed.

Although the dimensions of the coil 20 have been described in the second embodiment, as long as detection characteristics of the motion detecting apparatus satisfy the specifications, the dimensions such as the thickness T in the axial direction of the coil 20, the minimum inside diameter $\phi i$ of the conductor 22, and the maximum outside diameter $\phi e$ of the conductor 22 may be different from the above-described dimensions. The excitation frequency "f" of the coil 20 may be higher or lower than 10 MHz.

The inductance of the coil 20 may be larger than 1 µH, and the interval D between the coil 20 and the turbine blade 12 may be smaller than 1 mm. As long as the detection characteristics of the motion detecting apparatus are satisfied, the inductance of the coil 20 may be smaller than 1 µH, and the interval D between the coil 20 and the turbine blade 12 may be larger than 1 mm.

The conductor 22 may be wound in an almost triangle shape or polygonal shape having five or more corners.

As described above, the present invention is not limited to the foregoing embodiments but can be variously modified without departing from the gist of the invention.

What is claimed is:

1. A motion detecting apparatus comprising:
a conductive part to be detected, provided for an object to be detected;
a coil generating a magnetic field and disposed so that the part to be detected passes nearby as the object to be detected moves; and
detecting means for detecting the motion of the object to be detected by detecting a change in inductance of the coil as the part to be detected passes near the coil,
wherein the part to be detected has a fin shape of which width in the motion direction of the object to be detected is narrow at its end confronting the coil, and the part to be detected is inclined with respect to the motion direction of the object to be detected;
a passage period in which the part to be detected passes near the coil and a non-passage period are almost the same;
the coil is disposed so that its end in a center axis direction faces the object to be detected, and
a plurality of parts to be detected are arranged in the motion direction of the object to be detected, at an angle with respect to the motion direction of the object to be detected, in accordance with intervals of the parts to be detected and the diameter of the coil.

2. A motion detecting apparatus comprising:
a conductive part to be detected, provided for an object to be detected;
a coil generating a magnetic field and disposed so that the part to be detected passes nearby as the object to be detected moves; and
detecting means for detecting the motion of the object to be detected by detecting a change in inductance of the coil as the part to be detected passes near the coil,
wherein the part to be detected has a fin shape of which width in the motion direction of the object to be detected is narrow at its end confronting the coil, and the part to be detected is inclined with respect to the motion direction of the object to be detected;
the object to be detected rotates,
the part to be detected is inclined with respect to the rotation direction of the object to be directed;
the object to be detected is a turbocharger,
the part to be detected is a part of a turbine blade or a compressor blade of the turbocharger, and
the part to be detected is an end of the turbine blade or the compressor blade in the radial direction of the turbocharger.

3. The motion detecting apparatus according to claim 1, wherein the object to be detected rotates, and
the detecting means detects the number of revolutions, rotational speed, or rotation acceleration of the object to be detected on the basis of the number of times the part to be detected passes the coil in predetermined unit time.

4. A motion detecting apparatus comprising:
a coil generating a magnetic field and disposed in a position where a part to be detected passes nearby as an object to be detected moves; and
detecting means for detecting motion of the object to be detected by detecting a change in inductance of the coil as the part to be detected passes near the coil,
wherein the coil has conductors formed so as to be wound in different layers of a multilayer printed board, and a through hole connecting the plurality of conductors in series;
a passage period in which the part to be detected passes near the coil and a non-passage period are almost the same;
the coil is disposed so that its end in a center axis direction faces the object to be detected, and
a plurality of parts to be detected are arranged in the motion direction of the object to be detected, at an angle with respect to the motion direction of the object to be detected, in accordance with intervals of the parts to be detected and the diameter of the coil.

5. The motion detecting apparatus according to claim 4, wherein the coil further comprises an external connection terminal provided on a face opposite to the part to be detected, of the multilayer printed board.

6. The motion detecting apparatus according to claim 4, wherein the conductors are wound in a polygonal shape, and
the through hole on the outside of the conductors is disposed near the center of each of sides of the conductor.

7. The motion detecting apparatus according to claim 4, wherein the object to be detected is a turbocharger, and
the part to be detected is a part of a turbine blade or a compressor blade of the turbocharger.

8. The motion detecting apparatus according to claim 7, wherein inductance of the coil is 1 µH or larger, and
the maximum outside diameter of the conductor is 3 mm to 10 mm.

9. The motion detecting apparatus according to claim 8, wherein the coil is disposed so that an end in the axial direction faces the turbocharger, and
thickness in the axial direction of the coil is 2 mm or less.

10. The motion detecting apparatus according to claim 8, wherein a resistance value of the coil is 3Ω or less.

11. A motion detecting apparatus comprising:
a coil generating a magnetic field and disposed in a position where a part to be detected passes nearby as an object to be detected moves; and
detecting means for detecting motion of the object to be detected by detecting a change in inductance of the coil as the part to be detected passes near the coil,
wherein the coil has conductors formed so as to be wound in different layers of a multilayer printed board, and a through hole connecting the plurality of conductors in series;
the object to be detected rotates,
the part to be detected is inclined with respect to the rotation direction of the object to be detected,
the object to be detected is a turbocharger,
the part to be detected is a part of a turbine blade or a compressor blade of the turbocharger, and
the part to be detected is an end of the turbine blade or the compressor blade in the radial direction of the turbocharger.

12. The motion detecting apparatus according to claim 11, wherein the coil further comprises an external connection terminal provided on a face opposite to the part to be detected, of the multilayer printed board.

13. The motion detecting apparatus according to claim 11, wherein the conductors are wound in a polygonal shape, and
the through hole on the outside of the conductors is disposed near the center of each of sides of the conductor.

14. The motion detecting apparatus according to claim 11, wherein inductance of the coil is 1 µH or larger, and
the maximum outside diameter of the conductor is 3 mm to 10 mm.

15. The motion detecting apparatus according to claim 14, wherein the coil is disposed so that an end in the axial direction faces the turbocharger, and
thickness in the axial direction of the coil is 2 mm or less.

16. The motion detecting apparatus according to claim 14, wherein a resistance value of the coil is 3Ω or less.

* * * * *